United States Patent
Miles

(10) Patent No.: US 6,296,718 B1
(45) Date of Patent: Oct. 2, 2001

(54) ENVIRONMENTALLY FRIENDLY METHOD OF PAINT STRIPPING REJECT PAINTED PARTS, WITH NO BASE METAL ATTACK

(76) Inventor: Samuel Lee Miles, 5246 Aintree, Rochester, MI (US) 48306

( * ) Notice: Subject to any disclaimer, the term of this patent is extended or adjusted under 35 U.S.C. 154(b) by 0 days.

(21) Appl. No.: 09/681,145

(22) Filed: Jan. 26, 2001

(51) Int. Cl.$^7$ .......................................................... B08B 3/02
(52) U.S. Cl. ................................... 134/19; 134/2; 134/3; 134/22.14; 134/22.19; 134/30; 134/36; 134/38; 134/41; 134/42; 510/201; 510/202; 510/212; 510/421; 510/437
(58) Field of Search ................................ 134/2, 3, 22.19, 134/36, 38, 41, 42, 22.14, 30; 510/201, 202, 212, 421, 437

(56) References Cited

U.S. PATENT DOCUMENTS

| | | | | |
|---|---|---|---|---|
| 4,673,524 | * | 6/1987 | Dean | 252/118 |
| 4,854,973 | * | 8/1989 | Holdar | 134/39 |
| 5,096,501 | * | 3/1992 | Dishart et al. | 134/10 |
| 5,310,496 | * | 5/1994 | Taylor | 252/171 |
| 5,346,640 | * | 9/1994 | Leys | 252/162 |
| 5,472,631 | * | 12/1995 | Harris | 252/171 |
| 5,894,854 | * | 4/1999 | Miles | 134/38 |
| 6,010,995 | * | 1/2000 | Van Eenam | 510/365 |
| 6,057,276 | * | 5/2000 | Smith | 510/174 |
| 6,074,999 | * | 6/2000 | Iizuka et al. | 510/201 |
| 6,096,699 | * | 8/2000 | Bergemann et al. | 510/201 |
| 6,130,192 | * | 10/2000 | Vitomir | 510/202 |

* cited by examiner

*Primary Examiner*—Sharidan Carrillo

(57) ABSTRACT

A method of stripping cured paint from reject painted production parts, aluminum and galvanized safe, comprising: a) adding a stripping composition to a strip tank, said stripping composition consisting an alkanolamine, a fatty acid and a surfactant; b) immersing said reject painted part in said strip tank containing said stripping composition; and c) heating said stripping composition to 300 degrees F. for approximately 1-hour, wherein cured paint is removed from said reject painted part with no attack on the base metal substrate.

10 Claims, No Drawings

ENVIRONMENTALLY FRIENDLY METHOD OF PAINT STRIPPING REJECT PAINTED PARTS, WITH NO BASE METAL ATTACK

BACKGROUND OF INVENTION

This invention is an environmentally friendly paint stripping composition, 99% free of volatile organic compounds. This is a method for the removal of cured paint from ferrous, aluminum and non-ferrous substrates with no attack on the base metal. More specifically, a paint stripping process invented to salvage reject painted production parts. The Industrial, Automotive and Aircraft Industries paint interior and exterior parts to protect the substrates from corrosion and also to enhance the cosmetic appearance to help market the finished product. Most manufacturers and finishing job shops that apply paint finishes have a paint defect or reject rate of 5% up to 30% of daily paint production. Paint finishing manufacturers and job shops can no longer afford to discard these expensive reject painted parts. This invention provides a process that may be placed in the paint finishing plant to completely strip the reject painted production parts, allowing the parts to be reprocessed through the paint system as first run quality parts. Prior art utilized many different compositions and methods to strip painted parts. Most prior art paint strip methods adversely change or affect the parts surface characteristics. Prior art methods included the following: Corrosive caustic or acid solutions that can attack soft base metal substrates such as aluminum, zinc die-cast, galvanized steel, brass and plated metals. Oven paint stripping requires temperatures of 600 F. to 1000 F., these temperatures are known to reduce the strength of steel, burn protective galvanized zinc and melt aluminum and brass parts. Corrosive salt baths that can operate in excess of 800 F. oxidize the parts surface and reduce metal strength. Organic solvents can stain metal surfaces and are not environmentally friendly. Organic solvents when heated release volatile organic compounds into our atmosphere. Abrasive paint stripping utilizes abrasive particles such as plastic, glass, metal, sand, ice crystals, CO2 and even crushed nutshells to blast the paint off the part. These abrasive methods while environmentally friendly do adversely change the parts surface characteristics. Abrasive blasting cannot remove paint from interior and recessed areas like an immersion chemical stripper can.

SUMMARY OF INVENTION

The inventor discovered improved methods to chemically strip reject painted production parts. This method is more environmentally desirable than past art paint strip methods. This invention is 99% free of volatile organic compounds and is considered to be non-corrosive, non-caustic, non-acid, non-abrasive, non-solvent and non-regulated with the department of transportation. The invention has demonstrated excellent paint removal on steel, aluminum, brass, zinc galvanized, zinc die-cast and plated substrates. The invention will not alter metal surfaces that can sustain 300 F. temperature from 1 to 3 hours immersion time. The composition effectively removes all current paint technologies including, not limited to the following: Electro deposition (E-Coat), Powder Technologies, Solvent and Water Based Enamels, Urethanes, Epoxy, Clear Coat Technologies. The method or process of use requires a ventilated immersion hot strip tank capable of 300 degrees Fahrenheit with adequate agitation. The composition is used as received, with no water or additives required. The invention is a unique composition that exhibits 99% free of volatile organic compounds, and is safe on aluminum, galvanized, steel and non-ferrous substrates.

DETAILED DESCRIPTION

The composition of this invention consists of;

a) an amine that when chemically reacted with a fatty acid converts to an alkanolamide. The amine can comprise of alkanolamines, such as monoethanolamine, triethanolamine, diethanolamine. The alkanolamine is in the range of 1–95 percent by weight, preferably 30–65 percent by weight. The chemical reaction formed amide can comprise of alkanol amides such as monoethanolamides, triethanolamides and diethanolamides.

b) a fatty acid comprised of oleic acid, stearic acid, Fractionated fatty acids such as: caproic, caprylic, capric, caprylic/capric, lauric, myristic, palmitic, behenic, erucic, Distilled fatty acids such as: coconut, palm kernel, linseed, tall oil, Hydrogenated fatty acids such as: rubber grade, marine, tallow, soya, carboxylic acids. The fatty acid is in the range of 1–95 percent by weight, preferably 30–65 percent by weight.

c) a surfactant comprised from: alkylphenol, nonylphenol, ethyleneoxy ethanol, poly alkoxylate, diethanolamide, triethanolamide, monoethaolamide; phosphate ester, ethoxylated alcohols, amine oxides. The surfactant is in the range of 1–95 percent by weight, preferably 1–50 percent by weight.

In accordance with this invention, it is discovered that defect painted production parts immersed in this composition, at 300 degrees Fahrenheit in an immersion hot strip process tank for 1 hour may be stripped completely for reprocess. This invention was tested for paint removal with present Industrial, Automotive, Wheel and Aircraft Industry paint technologies. Paint was from PPG, Dupont, BASF, Akzo Nobel, Ferro, Red Dot. Paint types tested were Powder, Solvent and Water Borne. Results were observed after parts were immersed in the composition for 1-hour at 300 degrees Fahrenheit, removed from the immersion tank and rinsed with fresh water. All parts panels were coated with 3-mil dry paint film build.

Parts were evaluated by three criteria, #1 Substrate Surface Appearance A—being uniform, B—slightly streaked, C—streaked, etched or oxidized.

2% Weight Loss, #3% Paint Stripped.

Substrate

% strip: Wt.Loss %: Appearance—A,B,C.

Aluminum 100% 0% A

Galvanized 100% 0% A

Zinc Die-Cast 100% 0% A

Brass 100% 0% A

Steel 100% 0% A

What is claimed is:

1. A method of stripping cured paint from aluminum, galvanized steel, steel and non-ferrous substrates comprising:

a) adding a stripping composition to a strip tank, said stripping composition consisting of an alkanolamine reagent, a fatty acid and a surfactant wherein said alkanolamine is selected from the group consisting of monoethanolamine, triethanolamine, and diethanolamine, wherein said fatty acid is selected from the group consisting of oleic acid, stearic acid, Fractionated fatty acids, caprylic, caproic, capric, caprylic/capric, lauric, myristic, palmitic, behenic, erucic, Distilled fatty acids, coconut, palm kernel, linseed, tall oil, Hydrogenated fatty acids, rubber grade, marine, Tallow, soya, and carboxylic acids and wherein said surfactant is selected from the group consisting of alkylphenols, nonylphenols, ethyleneoxy ethanols, poly alkoxylates, diethanolamides, triethanolamides, monoethanolamides, phosphate esters, ethoxylated alcohols, and amine oxides;

b) immersing said substrate in said strip tank containing said stripping composition; and c) heating said stripping composition to 300 degrees F. for approximately 1-hour, wherein cured paint is removed from said substrate.

2. The method of claim 1, wherein said alkanolamine is in the range of 1–95 percent by weight.

3. The method of claim 1, wherein said fatty acid is in the range of 1–95 percent by weight.

4. The method of claim 1, wherein said surfactant is in the range of 1–95 percent by weight.

5. The method of claim 1, wherein said alkanolamine is triethanolamine.

6. The method of claim 1, wherein said fatty acid is tall oil.

7. The method of claim wherein said surfactant is a diethanolamide.

8. The method of claim 2, wherein said alkanolamine is in the range of 30–65 percent by weight.

9. The method of claim 3, wherein said fatty acid is in the range of 30–65 percent by weight.

10. The method of claim 4, wherein said surfactant is in the range of 1–50 percent by weight.

* * * * *